(12) United States Patent
Zimmermann

(10) Patent No.: US 8,027,863 B2
(45) Date of Patent: Sep. 27, 2011

(54) METHOD FOR FORECASTING A FUTURE INVENTORY DEMAND

(75) Inventor: David Michael Zimmermann, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1363 days.

(21) Appl. No.: 11/590,353

(22) Filed: Oct. 31, 2006

(65) Prior Publication Data

US 2008/0103874 A1    May 1, 2008

(51) Int. Cl.
*G06Q 30/00* (2006.01)
(52) U.S. Cl. ..................................... 705/7.31; 705/7.25
(58) Field of Classification Search ................. 705/7.22, 705/7.25, 7.31
See application file for complete search history.

(56) References Cited

U.S. PATENT DOCUMENTS

| | | | |
|---|---|---|---|
| 2002/0143669 A1* | 10/2002 | Scheer | 705/28 |
| 2002/0169657 A1 | 11/2002 | Singh et al. | |
| 2002/0188487 A1 | 12/2002 | Fox | |
| 2003/0130966 A1 | 7/2003 | Thompson et al. | |
| 2003/0212590 A1* | 11/2003 | Klingler | 705/10 |
| 2004/0148217 A1 | 7/2004 | Lauring et al. | |
| 2004/0236794 A1 | 11/2004 | Fox | |
| 2005/0075949 A1 | 4/2005 | Uhrig et al. | |
| 2005/0096963 A1 | 5/2005 | Myr et al. | |
| 2005/0197876 A1 | 9/2005 | Benda et al. | |
| 2005/0222865 A1 | 10/2005 | Fox | |
| 2005/0267791 A1 | 12/2005 | LaVoie et al. | |
| 2006/0200376 A1* | 9/2006 | Wang et al. | 705/10 |
| 2007/0179922 A1* | 8/2007 | MacGregor | 706/21 |

OTHER PUBLICATIONS

Dr. Ian Wedgwood, "Lean Sigma: A Practitioner's Guide", Oct. 10, 2006, Prentice Hall, 65-66.*
Dr. Ian Wedgwood, "Lean Sigma: A Practitioner's Guide", Oct. 10, 2006, Prentice Hall, 65-69.*

* cited by examiner

*Primary Examiner* — Beth V Boswell
*Assistant Examiner* — William Porter
(74) *Attorney, Agent, or Firm* — Finnegan, Henderson, Farabow, Garrett & Dunner LLP

(57) ABSTRACT

A method for forecasting a future inventory demand includes receiving historical demand data associated with a part number and statistically analyzing the historical demand data associated with one or more part numbers to identify each part number as one of a seasonal part number, a quasi-seasonal part number, a high variability part number, or a non-seasonal part number. If the part number is identified as a seasonal part number, a first inventory requirement for a first predetermined portion of a future demand period is estimated. If the part number is identified as a quasi-seasonal part number, a second inventory requirement for a second predetermined portion of a future demand period is estimated, wherein the second predetermined portion of the future demand period is a multiple of the first predetermined portion. If the part number is identified as a high variability part number, a third inventory requirement for a third predetermined portion of a future demand period is estimated.

15 Claims, 3 Drawing Sheets

METHOD FOR FORECASTING A FUTURE INVENTORY DEMAND

TECHNICAL FIELD

The present disclosure relates generally to inventory management processes and, more particularly, to methods for forecasting a future inventory demand.

BACKGROUND

In many business environments, particularly those that involve high-volume sale and distribution of parts or supplies, proper inventory management is imperative to the successful operation of the business. In order to ensure that an on-hand inventory of parts is adequate to meet customer demand, many businesses analyze historical demand associated with their part inventories and forecast future demand for one or more selected parts. Based on the demand forecast, warehouse managers establish fixed minimum quantities of certain parts, thereby requiring that the warehouse stock a minimum quantity of the parts to comply with future demand forecast.

While the practice of stocking parts in anticipation of a future demand may ensure part availability in most cases, it often results in the buildup of unused inventory for some parts when actual demand fails to meet forecasted demand. This inventory stockpile may potentially consume valuable inventory management resources (e.g., storage space, etc.), reduce and/or waste the usable life of the part, and/or reduce profitability by expending capital for unsold and/or unused parts—capital that may have been invested in some other fashion. Thus, in order to determine an appropriate level of inventory stock to adequately respond to a future demand, while preventing the accumulation of excess inventory, methods for identifying and characterizing inventory demand may be required.

One method for identifying and forecasting supply chain demand is described in U.S. Patent Application Publication No. 2002/0169657 ("the '657 publication") to Singh et al. The '657 publication describes a method for predicting a future demand based on buyer trend, certain seasonal effects, and/or causal factors, such as change in supply, price, etc. The demand prediction method of the '657 publication analyzes historical demand data, models the demand by adapting the historical data to a Fourier series or multiple linear regression (MLR) algorithm, and applies the model to a future time period to produce a future demand profile. The Fourier series algorithm attempts to fit historical data that displays seasonality to a periodic (e.g., sine or cosine) function. The multiple linear regression algorithm, while more complex, allows the integration of multiple independent variables associated with demand (e.g., price, weather, demographics, competitor promotions, etc.) into the forecast.

Although the method described in the '657 publication includes multiple techniques for forecasting demand associated with a supply chain, it may be inaccurate. For example, the method of the '657 patent determines seasonality based on a "peak and valley" identification approach that analyzes the amplitude of the historical demand and flags data points that do not conform to predetermined demand threshold (e.g., exceed an acceptable level of deviation from a predetermined demand range). These data points may then be used to generate a Fourier series which attempts to model the periodicity of the demand. Those skilled in the art, however, will recognize that, in certain situations, seasonal demand may, in fact, exhibit irregular behavior that may not be periodic and may not be modeled using a Fourier series. Thus, in situations where historical demand data exhibits irregular seasonal demand patterns, the method of the '657 publication may be inefficient and inaccurate.

The presently disclosed method for classifying patterns in demand variability is directed toward overcoming one or more of the problems set forth above.

SUMMARY OF THE INVENTION

In accordance with one aspect, the present disclosure is directed toward a method for forecasting a future inventory demand. The method may include receiving historical demand data associated with a part number and statistically analyzing the historical demand data associated with one or more part numbers to identify each part number as one of a seasonal part number, a quasi-seasonal part number, a high variability part number, or a non-seasonal part number. If the part number is identified as a seasonal part number, a first inventory requirement for a first predetermined portion of a future demand period may be estimated. If the part number is identified as a quasi-seasonal part number, a second inventory requirement for a second predetermined portion of a future demand period may be estimated, wherein the second predetermined portion of the future demand period is a multiple of the first predetermined portion. If the part number is identified as a high variability part number, a third inventory requirement for a third predetermined portion of a future demand period may be estimated. It is contemplated that each of the first, second, and third inventory requirements may substantially differ in size and/or duration, and that each of these requirements may be determined using different processes and methods.

According to another aspect, the present disclosure is directed toward a method for establishing inventory quantities based on patterns of demand variability. The method may include receiving historical demand data associated with a plurality of parts of a product inventory, wherein historical demand data includes data gathered during a plurality of historical demand periods. The historical demand data may be filtered based on a plurality of predetermined exclusions to identify qualifying part numbers associated with the historical demand data. A first statistical analysis may be performed on the qualifying part numbers to identify seasonal part numbers among the qualifying part numbers. Based on results of the first statistical analysis, a seasonal fixed requirement associated with the seasonal part numbers may be established, wherein the seasonal fixed requirement corresponds to one or more monthly inventory levels associated with an inventory environment. A second statistical analysis may be performed on any qualifying part number not identified as a seasonal part number to identify quasi-seasonal part numbers, wherein the second statistical analysis is configured to identify corresponding portions of the historical demand data that exceed predetermined demand thresholds over multiple demand periods. Based on results of the second statistical analysis, a quasi-seasonal fixed requirement associated with quasi-seasonal part numbers may be established, wherein the quasi-seasonal fixed requirement includes a duration corresponding to a predetermined portion of the future demand period.

In accordance with yet another aspect, the present disclosure is directed toward a method for forecasting a future inventory demand. The method may include receiving historical demand data associated with a part number and statistically analyzing the historical demand data associated with the part number to identify a portion of a historical demand period as one of a seasonal, a quasi-seasonal, a high variability, or a non-seasonal. If the part number is identified as a seasonal part number, a first inventory requirement for a first predetermined portion of a future demand period may be estimated. If the part number is identified as a quasi-seasonal part number, a second inventory requirement for a second predetermined portion of a future demand period may be estimated, wherein the second predetermined portion of the future demand period is a multiple of the first predetermined portion. If the part number is identified as a high variability part number, a third inventory requirement for a third predetermined portion of a future demand period may be estimated.

DETAILED DESCRIPTION

Figure 1:
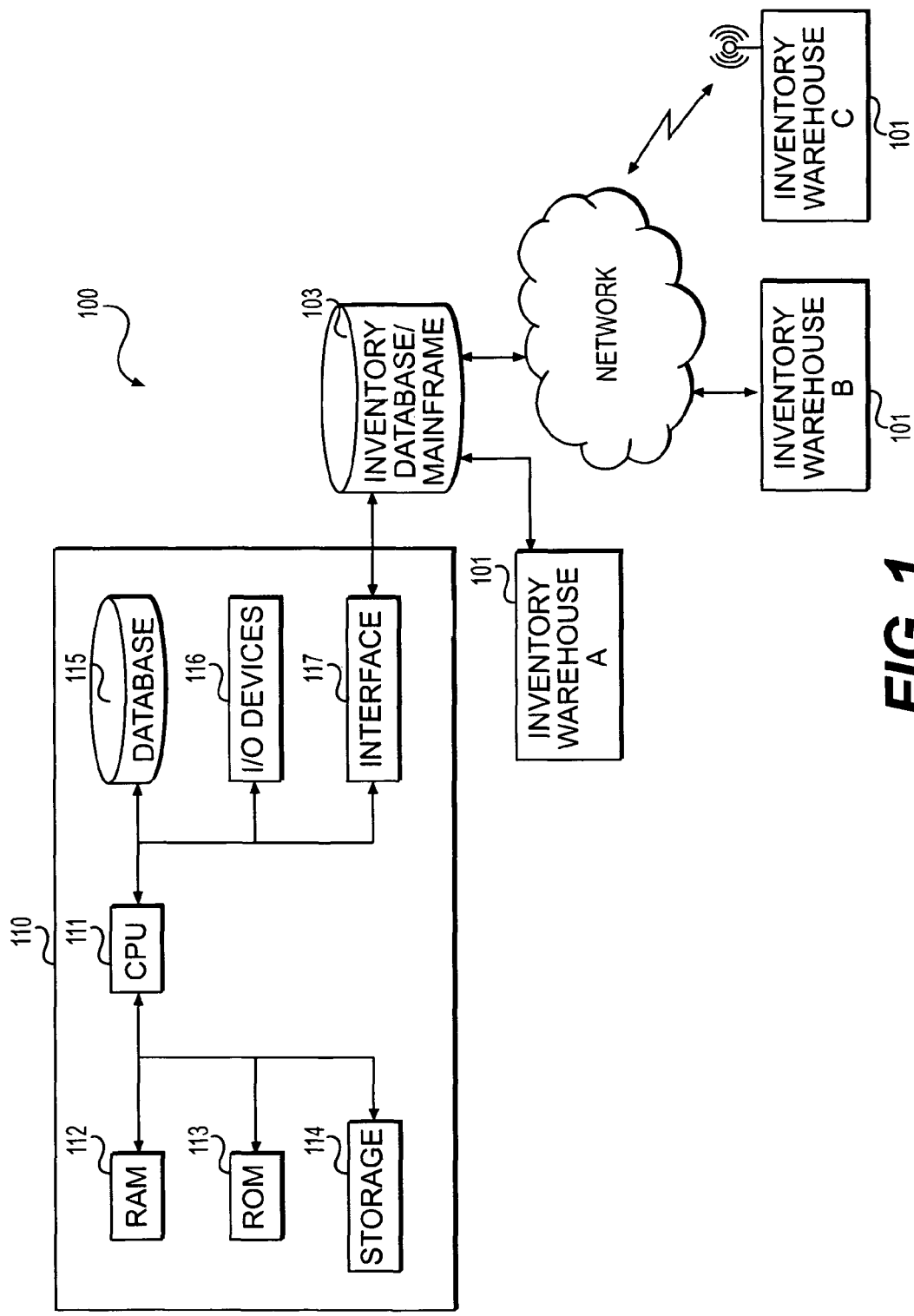
FIG. 1 illustrates an exemplary inventory environment in which processes and methods consistent with the disclosed embodiments may be implemented.

FIG. 1 provides a block diagram illustrating an exemplary disclosed inventory environment 100. Inventory environment 100 may include any type of environment associated with monitoring and/or managing an inventory that includes a population of elements. For example, inventory environment 100 may include a product warehouse configured to receive and distribute large numbers of products for operating a business. Inventory environment 100 may include, among other things, an inventory warehouse 101 containing a plurality of products, an inventory database 103, and a system 110 for forecasting future inventory demand.

Inventory warehouse 101 may include any type of facility for storing a plurality of products. Products, as the term is used herein, may include any physical or virtual element that may be used as a product associated with a business. Non limiting examples of physical products may include machines or machine parts or accessories such as, for example, electronic hardware or software, work implements, traction devices such as tires, tracks, etc., transmissions, engine parts or accessories, fuel, or any other suitable type of physical product. Non limiting examples of virtual products may include inventory data, product documentation, software structures, software programs, financial data or documents such as stock records, or any other type of virtual product. Inventory warehouse 101 may include, for example, a parts depot, a product showroom, a document storage facility, or any other type of facility suitable for storing physical and/or virtual products.

Inventory database 103 may include any type of electronic data storage device that may store data information. Inventory database 103 may contain one or more inventory records associated with each of the plurality of products associated with inventory warehouse 101. Inventory database 103 may constitute a standalone computer system that includes one or more computer programs for monitoring and/or maintaining inventory records associated therewith. Alternatively and/or additionally, inventory database 103 may be integrated as part of an inventory warehouse computer or system 110 for maintaining inventory records. It is also contemplated that inventory database 103 may include a shared database between one or more computer systems of business entities associated with inventory warehouse 101, such as an accounting division, a sales division, a supplier, or any other appropriate business entity that may typically deal with an inventory warehouse.

System 110 may include any type of processor-based system on which processes and methods consistent with the disclosed embodiments may be implemented. For example, as illustrated in FIG. 1, system 110 may include one or more hardware and/or software components configured to execute software programs, such as software for managing inventory environment 100, inventory monitoring software, or inventory transaction software. For example, system 110 may include one or more hardware components such as, for example, a central processing unit (CPU) 111, a random access memory (RAM) module 112, a read-only memory (ROM) module 113, a storage 114, a database 115, one or more input/output (I/O) devices 116, and an interface 117. Alternatively and/or additionally, system 110 may include one or more software components such as, for example, a computer-readable medium including computer-executable instructions for performing methods consistent with certain disclosed embodiments. It is contemplated that one or more of the hardware components listed above may be implemented using software. For example, storage 114 may include a software partition associated with one or more other hardware components of system 110. System 110 may include additional, fewer, and/or different components than those listed above. It is understood that the components listed above are exemplary only and not intended to be limiting.

Figure 2:
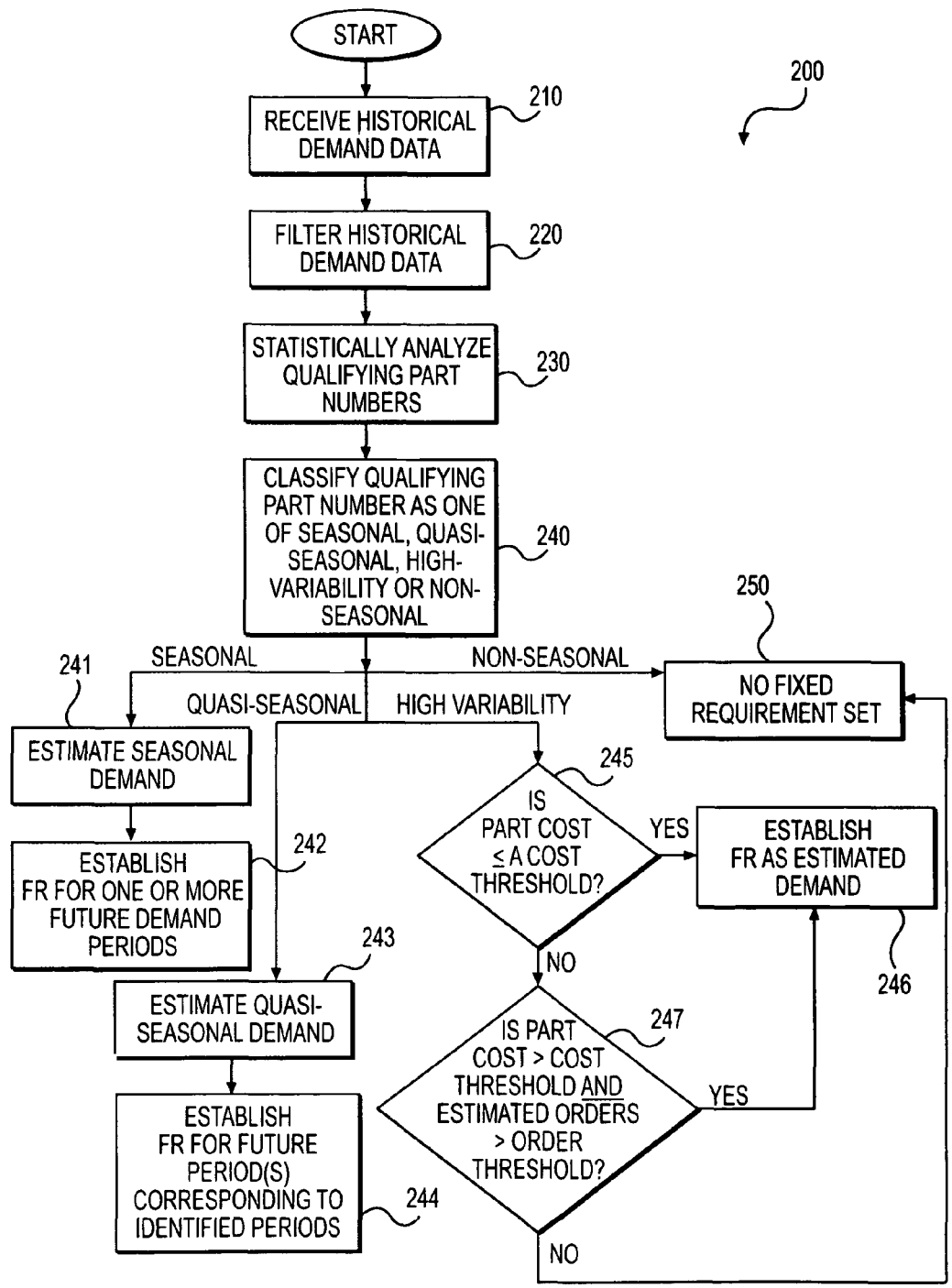
FIG. 2 provides a flowchart depicting an exemplary disclosed method for forecasting inventory demand consistent with certain disclosed embodiments.

CPU 111 may include one or more processors, each configured to execute instructions and process data to perform one or more functions associated with system 110. As illustrated in FIG. 2, CPU 111 may be communicatively coupled to RAM 112, ROM 113, storage 114, database 115, I/O devices 116, and interface 117. CPU 111 may be configured to execute sequences of computer program instructions to perform various processes, which will be described in detail below. The computer program instructions may be loaded into RAM for execution by CPU 111.

RAM 112 and ROM 113 may each include one or more devices for storing information associated with an operation of system 110 and/or CPU 111. For example, ROM 113 may include a memory device configured to access and store information associated with system 110, including information for identifying, initializing, and monitoring the operation of one or more components and subsystems of system 110. RAM 112 may include a memory device for storing data associated with one or more operations of CPU 111. For example, ROM 113 may load instructions into RAM 112 for execution by CPU 111.

Storage 114 may include any type of mass storage device configured to store information that CPU 111 may need to perform processes consistent with the disclosed embodiments. For example, storage 114 may include one or more magnetic and/or optical disk devices, such as hard drives, CD-ROMs, DVD-ROMs, or any other type of mass media device.

Database 115 may include one or more software and/or hardware components that cooperate to store, organize, sort, filter, and/or arrange data used by system 110 and/or CPU 111. For example, database 115 may include historical data such as, for example, previous inventory records, monthly customer order history, historical demand data, or any other type of historical data. CPU 111 may access the information stored in database 115 to perform statistical analysis on historical demand data associated with part number corresponding to parts stored in inventory warehouse 101. CPU 111 may also analyze current and previous inventory count records to identify trends in historical demand data. These trends may then be recorded and analyzed to adjust one or more aspects associated with an inventory control process, such as inventory fixed requirements and minimum stock levels one or more part numbers. It is contemplated that database 115 may store additional and/or different information than that listed above. Furthermore, although database 115 and inventory database 103 are illustrated as separate entities, it is contemplated that database 115 may include inventory database 103. Alternatively, data stored in inventory database 103 may be automatically and/or periodically stored in database 115. Here, database 115 may be used as a backup storage device for inventory database 103, enabling data recovery in the event of loss of data associated with inventory database 103.

I/O devices 116 may include one or more components configured to communicate information with a user associated with system 110. For example, I/O devices may include a console with an integrated keyboard and mouse to allow a user to input parameters associated with system 110. I/O devices 116 may also include a display including a graphical user interface (GUI) for outputting information on a monitor. I/O devices 116 may also include peripheral devices such as, for example, a printer for printing information associated with system 110, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 117 may include one or more components configured to transmit and receive data via a communication network, such as the Internet, a local area network, a workstation peer-to-peer network, a direct link network, a wireless network, or any other suitable communication platform. For example, interface 117 may include one or more modulators, demodulators, multiplexers, demultiplexers, network communication devices, wireless devices, antennas, modems, and any other type of device configured to enable data communication via a communication network.

According to one embodiment, system 110 may be configured to perform statistical analysis processes to predict or forecast future demand associated with one or more products associated with inventory environment 100. In particular, system 110 may be configured to identify and/or classify certain seasonal and/or predictably variable patterns in historical demand. Based on the classification, system 110 may establish certain fixed requirements for one or more part numbers associated with inventory environment. Fixed requirement, as the term is used herein, refers to any value or requirement that may be placed in an inventory record that specifies an inventory level that may be required to maintain an appropriate stock level associated with a part number. For instance, a fixed requirement may include an minimum inventory level associated with a particular part to meet an expected increase in demand, due to historical seasonal increases. Fixed requirements may include quantitative and/or temporal requirements such as, for example, requirements that specify an inventory quantity to be maintained for a particular time period or duration. In one exemplary embodiment, fixed requirements may include minimum threshold levels associated with one or more part quantities in an inventory management database. The inventory management database may then provide notify an inventory management network or procurement system when the inventory has fallen below the threshold value.

Part number, as the term is used herein, refers to any system or method for identifying a part number in an inventory management system. For example, part numbers may include a part ID, name, description, symbol, RFID tag, or any other type of system for identifying and/or tracking a part number in an inventory management system. Part number, part, and component may be used synonymously in portions of the present disclosure to refer to associating specific historical demand data to particular products in a product inventory.

System 110 may be configured to identify seasonal inventory demand patterns for a part number and determine the type, duration, and scope of any fixed requirements placed on the part number. Seasonal demand, as the term is used herein, refers to any demand fluctuation within a demand period that exceeds a predetermined acceptable level of fluctuation. Seasonal demand may be divided into three categories: actual seasonal demand, quasi-seasonal demand, and high variability demand.

Actual seasonal demand ("seasonal demand" hereafter) refers to generally periodic increases and decreases in demand over a portion of the demand period, which generally correspond to "peak and valley" patterns. According to one embodiment, seasonal demand is determined by analyzing sub-periods within a larger demand period, although additional and/or different periods of demand analysis are contemplated. For example, for a particular part number, a normal, expected demand for a three-month period is 60 units. If, during multiple demand periods, the demand associated with that part number increased to 90 units during the three month period from May through July, the part number may be identified as seasonal corresponding to those months of increased demand.

Figure 3:
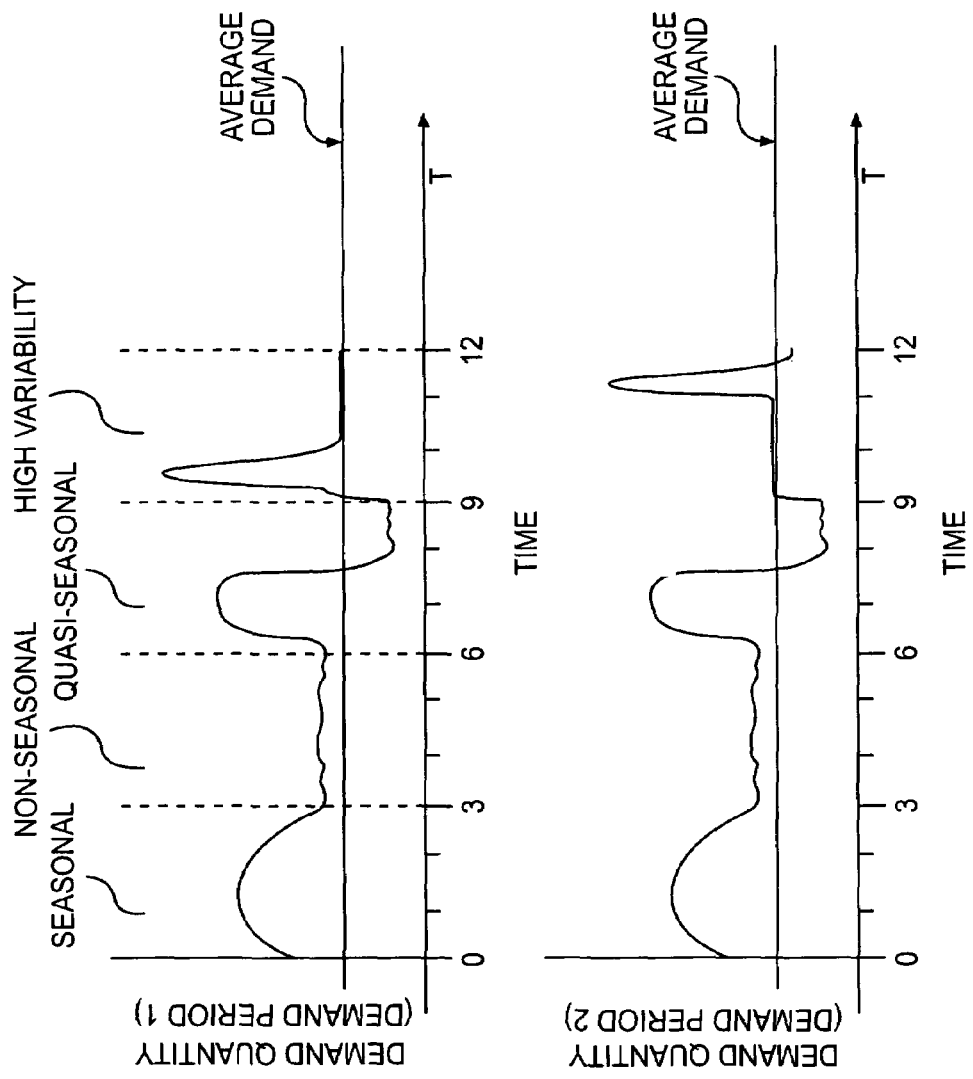
FIG. 3 illustrates exemplary first and second inventory demand periods depicting exemplary seasonal, quasi-seasonal, high variability, and non-seasonal demand patterns.

One example of seasonal demand is illustrated in FIG. 3. As illustrated in FIG. 3, between the time period between 0 and 3T, the demand for a particular part number exceeded the overall average (e.g., "normal") demand during two demand periods in a similar, predictable manner. Accordingly, the part number during the period between 0 and 3T may be identified as a seasonal part number.

Quasi-seasonal demand, as the term is used herein, refers to any demand pattern which may not be classified as seasonal, but which may exhibit consistent demand variability over the same period from one demand period to another. Following the example above, a particular part number may have a normal demand of 60 units over a three month period. However, during the three month period from May to July, while the three month demand remained at 60 units, the demand for May increased to 40 units, while the demand in both June and July decreased to 10 units. Although the demand may not be classified as seasonal, as the demand for the three month period remained at 60 units, it may be classified as quasi-seasonal due to demand fluctuations during months within the three-month period.

Quasi-seasonal demand may be determined by analyzing historical demand data associated with a plurality of demand periods (e.g., multiple 12 months periods). If, for example, the demand exceeds a predetermined "control" level for a particular demand sub-period (e.g., during 1 month of a first demand period), data may be analyzed for a larger sub-period (e.g., three months) for the second demand period. The larger sub-period includes the sub-period deemed out of control during the first demand period. If the demand is also "out of control" during any portion of the larger sub-period, the sub-period may be identified as quasi-seasonal, and a fixed requirement may be established for the particular sub-period.

For example, one exemplary manifestation of quasi-seasonal demand is illustrated in FIG. 3. As illustrated in FIG. 3, during the time period between 6T and 9T, the demand peaks during one portion of the time period and lags during another.

As a result, overall demand for the particular time period may not exceed the average, normal demand for the time period (and, thus, may not be identified as true seasonal). However, because the demand peaks and lags predictably during portions of the time period within that time period, the demand may be classified as quasi-seasonal.

High variability demand, as the term is used herein, refers to any demand that, while not exhibiting either seasonal or quasi-seasonal demand characteristics, the historical demand variability may exceed a predetermined threshold for the latest demand periods. For example, for a particular part number, historical demand data may indicate an increase in demand for May of year 1, which exceeds a predetermined demand threshold with a similar demand increase in August of year 2, while the demand for May in year 2 remained below the predetermined demand threshold. This similar increase in demand over multiple demand periods that does not correspond to the same three month period may be classified as a high variability demand—i.e., one that is highly variable and predictable from year-to-year, but exhibits neither seasonal nor quasi-seasonal demand, as provided herein.

According to one embodiment, a high variability demand test may include analyzing demand for a most recent demand period (e.g., 12-months). The test may include determining an average demand and a standard deviation associated with the most recent demand period. If the ratio of standard deviation to average demand for the historical demand period exceeds a predetermined value (e.g., 1), than a fixed requirement for high variability demand may be established for the previous demand period.

As illustrated in FIG. 3, high variability demand may be determined for each of demand period 1 and demand period 2. It should be noted that, according to an exemplary embodiment, a high variability test is conducted for a single, most recent demand period (e.g., for the most recent 12 month period). As such, a particular part number may exhibit high variability demand for each of demand periods 1 and 2, which are independent from one another.

Finally, in FIG. 3 during the time period between 3T and 6T, the part number may be classified as non-seasonal, since the demand does not exhibit any of the characteristics of seasonality or variability as described above. Specifically, the demand between the time periods 3T and 6T simply tracks the average demand for the entire demand period, which embodies but one example of non-seasonal demand.

Processes and methods consistent with the disclosed embodiments may provide a mechanism for identifying seasonal, quasi-seasonal or high variability inventory demand patterns and establishing fixed requirements for each part number according to its identified demand variability. FIG. 2 provides a flowchart 200 depicting an exemplary disclosed method for establishing inventory quantities based on patterns of demand variability. As illustrated in FIG. 2, system 100 may receive historical demand data associated with one or more part numbers (Step 210). This data may be received from inventory database 103 periodically or, alternatively, in response to a request from system 110. Historical demand data may include any type of data corresponding to a historical demand associated with one or more part numbers such as, for example, past customer orders, recorded database entries, past inventory stock replenishment data, past shipment records, historic inventory levels, or any other data or combination of data from which inventory demand may be derived. According to one aspect, historic demand data may include annual or yearly data corresponding with the fiscal year cycle of an organization.

Once the historical demand data has been received, system 110 may filter the historical demand data to exclude certain part numbers from further analysis (Step 220). These part number may include predetermined (i.e., user-selected) part numbers or part numbers that conform to certain predetermined exclusions. For example, new part numbers may be automatically excluded for not having an adequate amount of historical demand data. Alternatively and/or additionally, certain high-volume or high-demand part numbers may be excluded to prevent delay in filling customer orders for the particular part. In some cases, certain discontinued and/or outdated part numbers may be excluded, so that the discontinued part numbers may be gradually phased out with the introduction of a replacement part.

Upon excluding historical demand data associated with certain non-qualifying part numbers, system 110 may statistically analyze the remaining (qualifying part numbers) (Step 230). This statistical analysis may include one or more seasonality tests which may be performed sequentially or simultaneously. According to an exemplary embodiment, these tests are performed sequentially in an effort to reduce data processing requirements associated with performing simultaneous statistical analyses. Those skilled in the art, however, will recognize that the seasonality tests associated with the statistical analysis may be performed simultaneously.

According to one exemplary embodiment, system 110 may include software for performing an autocorrelation test and/ or one or more T-tests on the historical demand data associated with a particular part number to identify seasonal statistical variations that may be present in different annual demand periods. Should the same variations exist from year-to-year during the same three month period(s), system 110 may classify that particular part number as a seasonal part. In addition to identifying the particular part number as seasonal, system 110 may provide analysis data, which may be used to determine an amount by which the variation deviates from a normal level. For instance, system 110 may perform an autocorrelation test along with a battery of T-tests on historical demand data associated with a particular part number. Should the analysis indicate that, during a three month period from January through March, the actual demand exceeded the expected demand by an average of 27 pieces over multiple historical demand periods, the software may classify the particular part number as a seasonal part number corresponding to the seasonality of demand for three month period from January though March.

According to another exemplary embodiment, system 110 may include software for performing a quasi-seasonal test to identify demand variations for part numbers that do not exhibit true seasonality. The quasi-seasonal test may include generating control charts for each year of a historical demand period. These control charts may establish a limit of acceptable variation for the demand, based on an estimated average demand. If the historical demand data exceeds the limit established by the control chart during the same period for multiple demand periods, the period is determined to be "out of control" and the part number is identified as quasi-seasonal for out of control demand periods.

According to yet another exemplary embodiment, system 110 may include software for performing a high variability demand test to identify demand variations for any part numbers that may not exhibit seasonal or quasi-seasonal demand. The high variability test may include determining a coefficient of variation associated with the historical demand data for a plurality of historical demand periods as:

$$c_v = \frac{\sigma}{\mu}$$

where $c_v$ is the coefficient of variation for the demand of the part number over a particular portion of the demand period, $\sigma$ is the standard deviation of the historical demand calculated for the portion of the demand period, and $\mu$ is the demand mean for a given portion of the demand period. The size of the portion of the demand period may be predetermined and/or user-specified. For example, the coefficient of variation may be calculated for weekly periods of the historical demand data if a user suspects that significant demand variability may occur on a weekly basis. Alternatively, the coefficient of variation may be calculated in monthly portions corresponding to one or more monthly inventory control processes (e.g., inventory audits, part counts, etc.) associated with a particular inventory environment. If the coefficient of variation, $c_v$, exceeds 1 for the historical demand period, the part number may be identified as a high variability part number.

Based on the statistical analysis, one or more part numbers may be classified as seasonal, quasi-seasonal, or high variability (Step 240). For example, software associated with system 110 may, after statistical analysis has identified the type of variability (if any) associated with the historical demand data; classify each part number according to the identified variability. In addition, the software may store the statistical analysis data for each part number in database 115 associated with system 110 for further analysis. Although certain embodiments associated with the present disclosure may describe the classification of part numbers in a single category, it is contemplated that system 110 may classify certain portions of the demand period in different categories. As a result, a particular part number that exhibits seasonal behavior during a first portion of the historical demand period and quasi-seasonal behavior for a second portion of the historical demand period may contain multiple classifications. Accordingly, while demand associated with a part number may generally be classified as seasonal, quasi-seasonal, or high variability, it is contemplated that the part number may be classified in one or more of these categories based on the statistical analysis. Additionally, some qualifying part numbers may contain historical demand data that may not exhibit seasonal, quasi-seasonal, or high variability demand trend. These part numbers may optionally be classified as non-seasonal indicating that statistical analysis has been performed and demand variability has been identified.

For any part numbers classified as seasonal, system 110 may estimate the seasonal demand for the historical demand period, based on the statistical analysis data (Step 241). Software associated with system 110 may estimate, for any portion of the demand period identified as seasonal, a quantity or pieces in excess of an average demand over the entire demand period. For example, if the average demand for a particular demand period is 75 pieces per month over a twelve month period and the average seasonal demand for the three month period from January through March is 100 pieces, system 110 may estimate the seasonal demand for the three month period as 25 pieces.

Once the seasonal demand associated with the historical demand period has been estimated, system 110 may establish a monthly fixed requirement for a future demand period (Step 242). For instance, software associated with system 110 may set fixed control points associated with inventory database 103 for the next twelve month period based on the estimated seasonal demand. Accordingly, a monthly fixed requirement of 25 pieces may be established for each of January, February, and March, corresponding to additional supply (in addition to an expected demand of 75) required to meet the estimated seasonal demand. Similarly, no monthly fixed requirement may be established for the period from April through December, as the expected demand of 75 pieces should be sufficient to meet the customer demand.

For part numbers classified as quasi-seasonal, system 110 may be configured to estimate quasi-seasonal demand associated with demand periods identified as "out of control" during the quasi-seasonal analysis (Step 243). Quasi-seasonal demand may be estimated as the smaller quantity between a three month supply (based on average monthly demand for the historical demand period) and the average demand of the three month period where the demand is identified as "out of control".

System 110 may establish a three month fixed requirement for a future demand period corresponding to the portion of the historical demand period deemed "out of control" (Step 244). For example, software associated with system 110 may set a fixed control points in the inventory database for a future twelve month period, with three month fixed requirements established to compensate for increases in demand during any out of control three month portions of the future twelve month period. No fixed requirements may be required for any portions of the future demand period which has not been identified as out of control by the quasi-seasonal demand test.

For part numbers classified as high variability, certain criteria associated with the part number may be evaluated to determine the appropriate fixed requirement that may be necessary to respond an estimated demand trend. For part numbers with a part cost less than or equal to a cost threshold (Step 245: Yes), system 110 may establish a monthly fixed requirement as twice the estimated demand for each month in a future demand period (Step 246). For part numbers with a part cost greater than the cost threshold (Step 245: No), but with estimated customer orders greater than a order threshold (Step 247: Yes), system 110 may also establish a monthly fixed requirement as twice the estimated demand for each month in a future demand period (Step 246). However, for part numbers with a part cost of greater than a cost threshold and estimated customer orders less than an order threshold (Step 247: No), system 110 may not establish fixed requirements in addition to the estimated demand for that particular part number.

It is contemplated that, in addition to identifying a part number as one of seasonal, quasi-seasonal, high variability, and non-seasonal, a part number may classified as exhibiting one or more different types of demand during different demand periods. For example, FIG. 3 illustrates an exemplary part number that may include multiple demand classifications for a plurality of time periods.

INDUSTRIAL APPLICABILITY

Although methods consistent with the disclosed embodiments are described in relation to inventory warehouse environments, they may be applicable to any environment where it may be desirable to predict a future demand based on historical demand data. According to one embodiment, the disclosed method for classifying patterns of demand variability provide organizations with a process to efficiently and effectively predict inventory supply requirements for seasonal, quasi-seasonal, or high variability parts to meet customer demands, while avoiding the build-up of large inventory surplus.

The presently disclosed method for forecasting a future inventory demand may have several advantages. For example, because the presently disclosed method is adapted to identify multiple types of inventory demand patterns, inventory demand may be more accurately tracked and predicted. As a result, organizations that rely on accurate and robust historical inventory analysis to forecast future inventory requirements may become more efficient when compared to conventional systems that identify only seasonal inventory demand variability.

Additionally, the presently disclosed method may have certain cost benefits over conventional demand forecasting methods. For instance, because the disclosed method may more accurately track and predict inventory demand, speculative inventory over- and under-stocking practices may be reduced and/or eliminated. This may potentially result in a reduction of unproductive inventory overstocking, while ensuring appropriate levels of inventory demand to reliably meet customer needs.

It will be apparent to those skilled in the art that various modifications and variations can be made to the disclosed method for forecasting future inventory demand. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for forecasting a future inventory demand comprising:
   receiving, by a processor associated with a computer, historical demand data associated with a part number;
   identifying, by the processor, each part number as one of a seasonal part number, a quasi-seasonal part number, a high variability part number, or a non-seasonal part number;
   estimating, by the processor, a first inventory requirement for a first predetermined portion of a future demand period if the part number is identified as a seasonal part number;
   estimating, by the processor, a second inventory requirement for a second predetermined portion of a future demand period if the part number is identified as a quasi-seasonal part number, wherein the second predetermined portion of the future demand period is a multiple of the first predetermined portion; and
   determining, by the processor, a coefficient of variation for historical data corresponding to part numbers not identified as either seasonal or quasi-seasonal;
   identifying, by the processor, one or more of the part numbers as high variability part numbers if the coefficient of variation associated with a respective part number is greater than 1; and
   establishing, by the processor, a high variability fixed requirement associated with the one or more high variability part numbers, wherein establishing a high variability fixed requirement includes setting an inventory level associated with a respective part number substantially equal to one month of estimated demand for a respective part number if a cost associated with the respective part number is less than a predetermined cost threshold or the cost associated with the respective part number is greater than a predetermined cost threshold and the estimated demand of the part number is greater than a predetermined demand threshold.

2. The computer-implemented method of claim 1, further including filtering the historical demand data to exclude non-qualifying part numbers based on predetermined user criteria.

3. The computer-implemented method of claim 2, wherein the predetermined user criteria includes a minimum time period associated with the historical demand data, a minimum number of data entries associated with the historical demand data, or a list of excluded part numbers.

4. The computer-implemented method of claim 1, wherein identifying the one or more part numbers includes performing one or more of an autocorrelation test or a T-test to on the historical demand data associated with each part number to identify one or more seasonal part numbers.

5. The computer-implemented method of claim 4, wherein identifying the one or more part number further includes:
   establishing a control chart associated with the historical demand data for any part number not identified as a seasonal part number;
   comparing the control chart with the historical demand data associated with each part number not identified as a seasonal part number; and
   identifying as a quasi-seasonal part number any part number having historical demand data that exceeds the control chart by a predetermined threshold amount for a same portion of a historical demand period over multiple historical demand periods.

6. The computer-implemented method of claim 1, wherein establishing the high variability fixed requirement includes setting an inventory level associated with a respective part number substantially equal to zero for a respective part number if a cost associated with the respective part number is greater than a predetermined cost threshold and the estimated demand of the part number is less than a predetermined demand threshold.

7. A computer-implemented method for establishing inventory quantities based on patterns of demand variability comprising:
   receiving, by a processor associated with a computer, historical demand data associated with one or more part numbers, wherein historical demand data includes data gathered during one or more historical demand periods;
   performing, by the processor, a first statistical analysis on one or more part numbers to identify seasonal part numbers from among the one or more part numbers;
   establishing, by the processor based on the first statistical analysis, a seasonal fixed requirement associated with the seasonal part numbers, wherein the seasonal fixed requirement corresponds to one or more monthly inventory levels associated with an inventory environment;
   performing, by the processor, a second statistical analysis on any part number not identified as a seasonal part number to identify quasi-seasonal part numbers, wherein the second statistical analysis is configured to identify corresponding portions of the historical demand data that exceed predetermined demand thresholds over multiple demand periods; and
   establishing, by the processor based on the second statistical analysis, a quasi-seasonal fixed requirement associated with quasi-seasonal part numbers, wherein the quasi-seasonal fixed requirement includes a duration corresponding to a predetermined portion of the future demand period;
   determining, by the processor, a coefficient of variation for historical data corresponding to part numbers not identified as either seasonal or quasi-seasonal;

identifying, by the processor, one or more of the part numbers as high variability part numbers if the coefficient of variation associated with a respective part number is greater than 1; and establishing, by the processor, a high variability fixed requirement associated with the one or more high variability part numbers, establishing a high variability fixed requirement includes setting an inventory level associated with a respective part number substantially equal to one month of estimated demand for a respective part number if a cost associated with the respective part number is less than a predetermined cost threshold or the cost associated with the respective part number is greater than a predetermined cost threshold and the estimated demand of the part number is greater than a predetermined demand threshold.

8. The computer-implemented method of claim 7, further including filtering the historical demand data to exclude non-qualifying part numbers based on predetermined user criteria.

9. The computer-implemented method of claim 7, wherein establishing the high variability fixed requirement includes setting an inventory level associated with a respective part number substantially equal to zero for a respective part number if a cost associated with the respective part number is greater than a predetermined cost threshold and the estimated demand of the part number is less than a predetermined demand threshold.

10. The computer-implemented method of claim 7, wherein performing the first statistical analysis includes determining an auto-correlation between the historical demand data gathered during different historical demand periods.

11. The computer-implemented method of claim 7, wherein performing the first statistical analysis includes performing a T-test between the historical demand data gathered during different historical demand periods.

12. The computer-implemented method of claim 7, wherein performing the second statistical analysis includes:
establishing a control chart associated with the historical demand data;
comparing the control chart with the historical demand data associated with a respective part number; and
identifying as a quasi-seasonal part number any part number having historical demand data that exceeds the control chart by a predetermined threshold amount for a same portion of a historical demand period over multiple historical demand periods.

13. The computer-implemented method of claim 12, wherein establishing a quasi-seasonal fixed requirement includes setting an inventory level for the respective part number for the portion of the future demand period corresponding to the portion of the historical demand period in which the historical data exceeds the predetermined threshold amount over multiple historical demand periods.

14. A computer-implemented method for forecasting a future inventory demand comprising:
receiving, by a processor associated with a computer, historical demand data associated with a part number;
statistically, by the processor, analyzing the historical demand data associated with the part number to identify a portion of a historical demand period as one of a seasonal, a quasi-seasonal, a high variability, or a non-seasonal;
estimating, by the processor, a first inventory requirement for a first predetermined portion of a future demand period if the part number is identified as a seasonal part number;
estimating, by the processor, a second inventory requirement for a second predetermined portion of a future demand period if the part number is identified as a quasi-seasonal part number, wherein the second predetermined portion of the future demand period is a multiple of the first predetermined portion;
determining, by the processor, a coefficient of variation for historical data corresponding to part numbers not identified as either seasonal or quasi-seasonal;
identifying, by the processor, one or more of the part numbers as high variability part numbers if the coefficient of variation associated with a respective part number is greater than 1; and
establishing, by the processor, a high variability fixed requirement associated with the one or more high variability part numbers, wherein establishing a high variability fixed requirement includes setting an inventory level associated with a respective part number substantially equal to one month of estimated demand for a respective part number if a cost associated with the respective part number is less than a predetermined cost threshold or the cost associated with the respective part number is greater than a predetermined cost threshold and the estimated demand of the part number is greater than a predetermined demand threshold.

15. The computer-implemented method of claim 14, wherein statistically analyzing the one or more part numbers includes performing one or more of an autocorrelation test or a T-test to on the historical demand data associated with each part number to identify one or more seasonal part numbers.

* * * * *